United States Patent [19]

Bond et al.

[11] Patent Number: 5,560,822
[45] Date of Patent: Oct. 1, 1996

[54] APPARATUS TO REMOVE INORGANIC SCALE FROM A SUPERCRITICAL WATER OXIDATION REACTOR

[76] Inventors: Luke D. Bond, 20 Hardwick Court, Etobicoke, Ontario, M9C 4G5; Charles C. Mills, 3445 NightHawk Trail, Mississauga, Ontario, L5M 6G4; Philip Whiting, R.R.#3, Milton, Ontario, L9T 2X7, all of Canada; Stanley L. Koutz, 4449 Yerba Santa Dr., San Diego, Calif. 92115; David A. Hazlebeck, 486 Live Oak Dr., El Cajon, Calif. 92020; Kevin W. Downey, 6526 Malcolm Dr., San Diego, Calif. 92115

[21] Appl. No.: 455,713

[22] Filed: May 31, 1995

Related U.S. Application Data

[62] Division of Ser. No. 255,070, Jun. 7, 1994, Pat. No. 5,501,799.

[51] Int. Cl.$^6$ .......................................................... C02F 1/72
[52] U.S. Cl. ...................... 210/181; 210/195.1; 210/199; 210/201; 210/205; 422/196; 422/235
[58] Field of Search ...................... 210/762, 761, 210/181, 195.1, 200–202, 205; 422/188, 190, 196, 197, 198, 235, 242, 184

[56] References Cited

U.S. PATENT DOCUMENTS

| 2,944,396 | 7/1960 | Barton | 60/39.05 |
|---|---|---|---|
| 4,292,953 | 10/1981 | Dickinson | 126/263 |
| 4,543,190 | 9/1985 | Modell | 210/721 |
| 4,822,497 | 4/1989 | Hong et al. | 210/721 |
| 5,100,560 | 3/1992 | Huang | 210/721 |
| 5,200,093 | 4/1993 | Barner et al. | 210/761 |
| 5,250,193 | 10/1993 | Sawicki et al. | 210/761 |
| 5,252,224 | 10/1993 | Modell et al. | 210/761 |
| 5,358,646 | 10/1994 | Gloyna et al. | 210/761 |
| 5,384,051 | 1/1995 | McGinness | 210/761 |
| B1 4,338,199 | 11/1988 | Modell | 210/721 |

FOREIGN PATENT DOCUMENTS

| 0535320A | 4/1993 | European Pat. Off. |
| PCT/US81/00592 | 11/1981 | WIPO |
| PCT/US91/00606 | 8/1991 | WIPO |

*Primary Examiner*—Peter A. Hruskoci
*Attorney, Agent, or Firm*—Hoffman & Baron

[57] ABSTRACT

A supercritical water oxidation reactor is alternately supplied with a feed stream and a flushing stream. The feed stream contains organic and inorganic materials. The organic materials are oxidized under supercritical conditions in the reactor and the inorganic materials precipitate out of solution under the same conditions. The flushing stream is a solution in which the inorganic material is soluble. More than one supercritical water oxidation reactor may be connected so that the feed stream is alternately supplied to each reactor. During the period when the feed stream is being supplied to a reactor the effluent from the reactor is cooled to a temperature at which inorganic precipitates are soluble and is then supplied as a flushing stream to one or more of the remaining connected supercritical water oxidation reactors.

4 Claims, 5 Drawing Sheets

APPARATUS TO REMOVE INORGANIC SCALE FROM A SUPERCRITICAL WATER OXIDATION REACTOR

This is a divisional of application Ser. No. 08/255,070 filed on Jun. 7, 1994, now U.S. Pat. No. 5,501,799.

FIELD OF THE INVENTION

This invention relates to supercritical water oxidation reactors and to a method and apparatus to reduce the effect of inorganic precipitates on the efficient operation of such reactors.

BACKGROUND OF THE INVENTION

At temperatures and pressures below its critical point (approximately 374° C.), water is a poor solvent for non-polar materials (including many organic materials) and a good solvent for polar materials (including many inorganic materials). However, at and above the critical temperature of water, many organic compounds become readily soluble in water and many inorganic compounds become insoluble. For example, the solubility of inorganic salts in supercritical water is generally between 1 ppb and 100 ppm above about 450° C. (U.S. Pat. No. 4,338,199 (Model No. 1), column 3, lines 39–41).

The insolubility in water of inorganic compounds at critical conditions has been a major impediment to the development of supercritical water oxidation ("SCWO") reactors.

SCWO reactors are designed to oxidize organic compounds in water at temperatures and pressures above its' critical. Under such conditions SCWO reactors are capable of effecting substantially complete oxidation (and hence destruction) of many organic materials, including many toxic organic compounds. The products of such combustion are primarily superheated water, carbon dioxide, inorganic salts and heat. For this reason, SCWO has been proposed as a method of disposing of a wide range of wastes, which contain toxic or noxious organic components. Such wastes include sewage, animal wastes, paper mill wastes and petrochemical wastes. The noxious and toxic compounds suitable for treatment include virtually all oxidizable organic compounds, including dioxins. Supercritical reactors are known and have been described in U.S. Pat. No. 2,944,396 (Barton); No. 4,292,953 (Dickinson); No. 4,543,190 (Model No. 2); and others.

Dickinson discloses that a possible limitation to the use of supercritical water oxidation exists in the amount and nature of salts dissolved in the aqueous feed to the reactor. Due to the nature of the supercritical oxidation process, such salts can become concentrated or supersaturated in the reactor. Dickinson further states that with certain types of salts, this concentration effect can result in scaling in the reactor or scaling and/or plugging in downstream heat exchange equipment (column 6, lines 33–47).

Similarly, Model states, at column 8, lines 8–34, that in conventional apparatus, inorganics tend to build up on the walls causing hot spots with subsequent destruction of the walls. To overcome this problem, Model suggests that the inner wall of the reactor be clad with corrosion resistant alloys, such as Hastelloy C, and when high concentrations of inorganic constituents are present, a fluidized bed reactor can be used. However, to do so would greatly increase the cost of the supercritical oxidation reactor.

Several different approaches have been developed to try to overcome this scaling problem. U.S. Pat. No. 4,822,497 (Hong et al.) discloses a reactor for supercritical water oxidation of organic materials having an upper supercritical zone and a lower subcritical zone. Oxidation of organic materials and inorganic materials, including salts and salt precursors, occurs in the upper zone and salts and other insoluble inorganic precipitates from the oxidation reaction are transferred to the lower subcritical zone where they redissolve and are removed from the reactor as a solution or slurry.

U.S. Pat. No. 5,100,560 (Huang) discloses a supercritical oxidation reactor having an upper supercritical temperature zone and a lower reduced temperature zone. The walls of the reactor are scraped to remove precipitates which deposit on the walls bounding the supercritical temperature zone.

However, none of these approaches has achieved any commercial success and scaling from the precipitation of inorganic salts remains a major obstacle to the use of SCWO for the treatment of organics in waste streams when the waste stream includes inorganic compounds.

SUMMARY OF THE INVENTION

The invention is directed towards a method of operating a supercritical water oxidation reactor so as to reduce the effect of inorganic precipitates on its efficient operation. The supercritical water oxidation reactor having means for alternately supplying to said reactor a feed stream of oxidizable materials and a flushing stream in which inorganic compounds precipitated under supercritical conditions are soluble. The reactor also having means for raising the feed stream to supercritical conditions at which oxidizable compounds are oxidized and inorganic material is precipitated in said reactor. The method comprising the steps of: supplying a feed stream to said supercritical water oxidation reactor; raising the temperature of said feed stream to supercritical conditions and oxidizing the oxidizable materials in said feed stream; periodically terminating the supply of said feed stream to said reactor; supplying a flushing stream in which inorganic compounds precipitated under supercritical conditions are soluble to said reactor to remove inorganic material from said reactor; and repeating the preceding steps.

Another aspect of the invention is a method of oxidizing a mixture of organic compounds, inorganic compounds and water in a supercritical water oxidation reactor comprising the steps of: supplying a feed stream comprised of oxidizable organic materials, inorganic materials and water to a supercritical water oxidation reactor; supplying an oxidant to said reactor; raising the temperature in said reactor to create supercritical conditions whereby said organic compounds are oxidized and at least some of said inorganic materials are precipitated; and flushing said reactor with a flushing solution in which said inorganic materials are soluble.

A further aspect of the invention is a method of oxidizing a feed stream comprising organic compounds, inorganic compounds and water in two or more supercritical water oxidation reactors. The reactors are connected to permit the feed stream to be directed for oxidation in any one of the reactors and to permit the effluent stream from any one of said reactors to be directed to flow through any one or more of the remaining reactors as a flushing stream. The method comprising the steps of: directing said feed stream to one of said supercritical water oxidation reactors and supercritically oxidizing said feed stream whereby said organic compounds are oxidized and at least some of said inorganic compounds precipitate; cooling the effluent stream from said reactor in which supercritical oxidation is occurring to a temperature and pressure at which inorganic scale formed under supercritical conditions is soluble in said effluent stream and directing said effluent stream as a flushing stream to flush one or more of said remaining connected supercritical water oxidation reactors to remove inorganic precipitate from said one or more of said remaining connected reactors; and repeating the preceding steps with one of said remaining connected supercritical water oxidation reactors.

The invention is also directed towards a reactor combination for oxidizing a feed stream comprising organic compounds, inorganic compounds and water the reactor combination comprising: two or more connected supercritical water oxidation reactors; means to allow a feed stream to be directed for oxidation in any one of said reactors; means to allow the effluent stream from said any one of said reactors to cool to a temperature and pressure at which inorganic precipitate formed under supercritical conditions is soluble; and means to allow said cooled effluent stream to be directed as a flushing stream to at least one of said remaining connected two or more supercritical water oxidation reactors to remove inorganic precipitate therefrom.

A still further aspect of the invention is a method of continuously operating a supercritical water oxidation facility having at least two supercritical water oxidation reactors, means for alternately supplying a feed stream containing organic materials, inorganic materials and water and a flushing stream in which inorganic precipitates formed under supercritical conditions are soluble to the reactors, means for supplying an oxidant to the reactors, means for raising the feed stream to supercritical conditions at which substantially all of said organic materials are oxidized and at least some of said inorganic materials are precipitated, the method comprising the steps of: supplying a feed stream to at least one of said reactors; supplying an oxidant to said reactor; supercritically oxidizing substantially all of said organic materials in said reactor; allowing the effluent from said reactor to to cool to subcritical conditions at which inorganic compounds precipitated under supercritical conditions are soluble; directing said cooled effluent as a flushing stream to at least one of the remaining reactors; and repeating the preceding steps.

DESCRIPTION OF THE PREFERRED EMBODIMENTS

Figure 1:
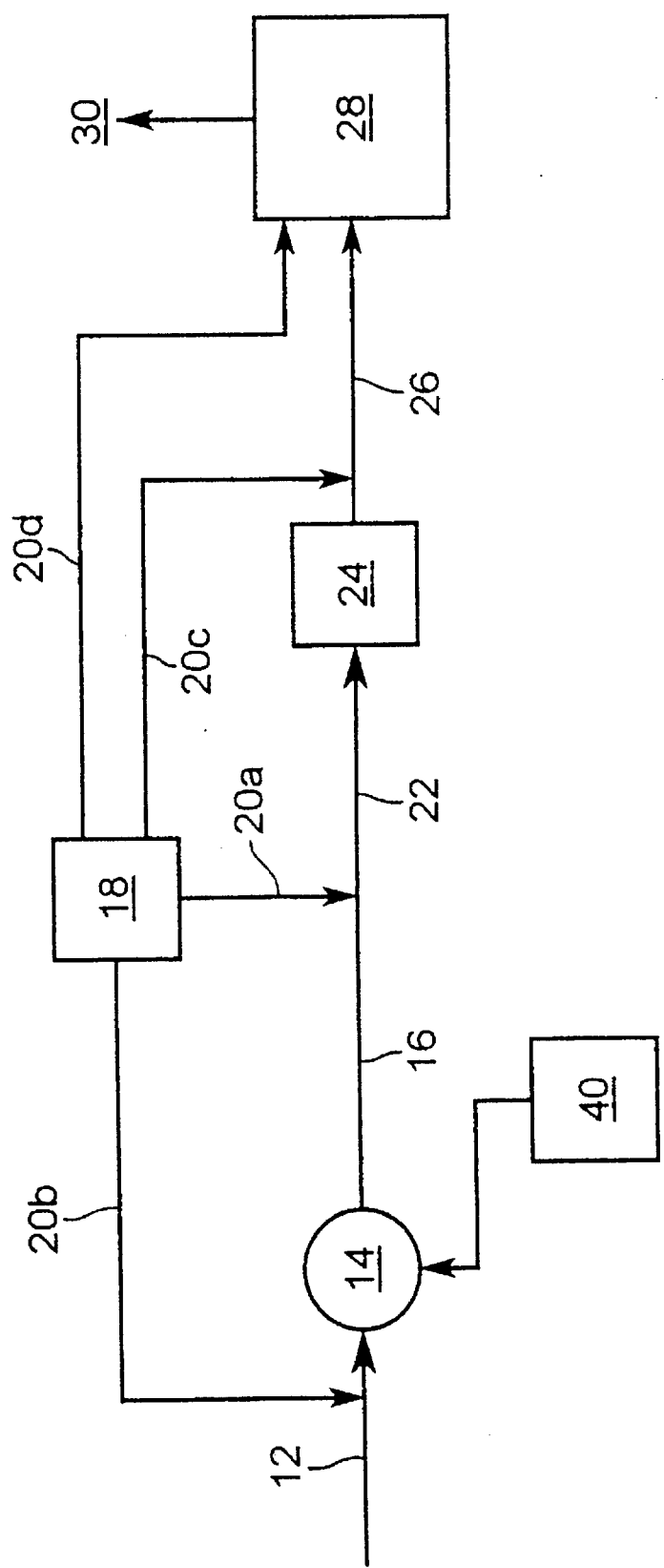
FIG. 1 is a schematic view of a process according to the present invention.

In the single reactor aspect of the present invention shown in FIG. 1, a feed stream to be treated (often a waste steam) is generally designated by reference numeral 12. The feed stream 12 contains organic materials oxidizable under supercritical conditions and may contain one or more inorganic materials including salts and salt precursors. The feed stream 12 may contain inorganic salts, such as calcium chloride, sodium chloride, sodium sulphide and sodium sulphate.

The feed stream 12 is pressurized by pump means 14. Pump means 14 may be a high pressure piston pump, a diaphragm pump or any other device known in the art which may be used to increase the pressure of a liquid stream.

The pressurized feed stream, which is designated as reference numeral 16, is then mixed with an oxidant. The oxidant may be stored in a storage vessel 18 and fed to pressurized feed stream 16 via an oxidant stream 20(a). The oxidant is preferably at a pressure at least slightly higher than the pressure of the pressurized feed stream 16.

The oxidant stored in storage vessel 18 may, in alternate embodiments be added to the unpressurized feedstream 12 via oxidant stream 20(b), to the heated feed stream 26 via oxidant stream 20(c), or to the reactor 28 itself via oxidant stream 20(d). If added to the heated feed stream 26 or to the reactor 28, the oxidant is preferably pressurized to a pressure slightly higher than that of the pressurized feed stream 26.

The oxidant may be any of those which are known in the art of oxidation, including, but not limited to, hydrogen peroxide, sodium peroxide, compressed air, liquid oxygen, compressed oxygen and mixtures thereof.

The pressurized feed stream 16 and oxidant stream 20 are mixed to produce a combined feed/oxidant stream 22. The temperature of the feed/oxidant stream 22 is then increased to below the critical temperature of the feed/oxidant stream 22. The heat source can be any conventional heat source although in most cases, as in this case, it is convenient to use a heat exchanger 24, by means of which heat from the reactor effluent 30 can be used to heat the feed/oxidant stream 22. A counter-current heat exchanger is preferred in the embodiments shown here. Alternatively, the feed stream 16 and the oxidant stream 20 may be mixed together at the point of entry to the heat exchanger 24. The oxidation reaction begins as the temperature of the feed/oxidant stream 22 is raised by heat exchanger 24.

The temperature of the feed/oxidant stream 22 is preferably raised, during passage through the heat exchanger 24, to a temperature below the critical temperature of the feed/oxidant stream 22, so that inorganic compounds in the feed/oxidant stream 22 remain in solution, but preferably near enough to the critical temperature that supercritical conditions can be achieved adiabatically in the reactor 28. Generally a suitable temperature is in the region of about 300° C.

The outflow from the heat exchanger 24 is a heated feed/oxidant stream 26. The heated feed/oxidant stream 26 is fed to a reactor 28 wherein the supercritical oxidation occurs. The reactor 28 may be any type of vessel, pipe or other reactor known in the art which is capable of maintaining structural integrity at elevated temperatures and pressures. The residence time of the heated feed/oxidant stream 26 in the reactor 28 is sufficient to allow the oxidation reaction to proceed substantially to completion. If there is a stoichiometric excess of oxidant present then, in many cases, greater than 99% oxidation of the organic compounds in the feed stream 12 can often be achieved. Generally, due to the rapid nature of supercritical oxidation, a residence time of one minute or less is sufficient.

The oxidation of the organic material that has commenced in heat exchanger 24 generally produces sufficient heat adiabatically to raise the temperature of the contents of the reactor 28 above the critical temperature so that supercritical conditions are achieved in the reactor. If the oxidation is being carried out as a continuous process in the pipe reactor, and depending on the flow rate, 10% to 50% of the organic material in the feed stream 12 is oxidized before the mixture reaches supercritical temperature. If the heat of oxidation is insufficient, then heat must be added to the reactor to attain a critical or supercritical temperature. This can be done by any conventional means.

Preferably, the contents of the reactor 28 are raised to a temperature from about the critical temperature of the feed stream, which may be as low as 320° C., to about 800° C., more preferably from about 374° C. to about 650° C. and most preferably to about 450° C. to 600° C. In order to maintain the desired temperature of the feed stream in reactor 28, additional heating or cooling of the reactor may be necessary using conventional means.

Once the temperature of the contents of the reactor 28 exceeds the critical temperature of the feed/oxidant stream 22, then the inorganic compounds including salts in the feed/oxidant stream 22 will precipitate out of solution and stick to the walls of the reactor 28 as scale.

The reaction products, which are primarily superheated water, and carbon dioxide exit the reactor as effluent stream 30 and gas which can be depressurized and cooled by convention means.

The buildup of inorganic precipitates and scale on the interior of the supercritical water oxidation reactor obstructs the flow of the feed/oxidant stream through the reactor thereby reducing throughput, interferes with heat transfer through the reactor walls making it difficult to control conditions in the reactor and accelerates corrosion of the reactor walls.

In accordance with the present invention,the feed to the pump means 14 is periodically switched from the feed stream 12 to a flushing stream 40 comprised of a liquid in which the inorganic precipitates and scale are soluble. The flushing stream may, for example, be a sub-critical aqueous stream. Sub-critical means that the temperature of the flushing stream 40 is below the critical temperature of the flushing stream. The flushing stream may be, for example, fresh water or cooled effluent from an SCWO reactor. The flushing stream 40 will create subcritical conditions in the reactor under which the inorganic precipitates and scale deposited in the reactor under supercritical conditions are soluble and inorganic precipitates and scale are removed from the reactor 28 by the flushing stream. The flushing stream 40 may alternately by-pass the heat exchanger 24 and be directed to the reactor 28 itself.

The temperature of the flushing stream 40 is preferably raised to a temperature of about 300° C. which is sub-critical but high enough to promote the dissolution of the inorganic precipitates and scale.

The flushing stream 40 will reduce the reactors temperature below the critical temperature of the flushing stream at which point the inorganic scale will begin to dissolve in the flushing stream 40. The time required to dissolve the inorganic precipitates and scale will depend on the characteristics of the reactor (type, diameter, throughput rate etc) and the solubility of the precipitate.

Once the inorganic precipitate and scale has been dissolved by the flushing stream 40, the pump means 14 is switched back to the feed stream 12. The temperature of the reactor 28 is then raised to the desired supercritical level, and the oxidation reaction recommences.

The extent to which the throughput of the reactor 28 is obstructed by scaling can be readily determined by, for example, measuring the pressure drop across the reactor 28 during operation. The pressure drop will increase as scaling obstructs fluid flow through the reactor.

If the feed stream 12 is the effluent from a continuous industrial process the effluent generated during the period when the reactor 28 is being flushed must be stored and excess capacity must be built into the system to handle this stored effluent together with effluent generated while the reactor is oxidizing organics.

FIGS. 2(a) through 2(d) show four operating phases of a further aspect of the present invention, in which a first reactor 52 and a second reactor 54 are used to allow continuous operation.

The feed stream 56 is heated in the heat exchanger 50 and can then be switched between the first reactor 52 and the second reactor 54 by opening and closing the valves shown as 60, 62, 64, 66, 68, 70, 72, 74, 76, 78, 80.

The figures are identical except for status of the valves (open or shut) which change the flow of the feed/oxidant stream 56, the heated stream 58, the hot reactor effluent 84 and the cooled reactor effluent 86 through the reactors 52 and 54 and heat exchanger 50. The addition of the oxidant to the feed stream to produce feed/oxidant stream 56 is not shown.

This aspect of the invention allows substantially continuous operation since one reactor is always active, with supercritical oxidation taking place in it, while the other reactor is idle and being flushed with the reactor effluent from the active reactor.

If the rate at which the scale dissolves is lower than the rate of scaling, as may be the case with some precipitates, more than two reactors may be used. If three reactors are used for example, each reactor is flushed for approximately twice the length of time it is used for oxidation.

Figure 2A:
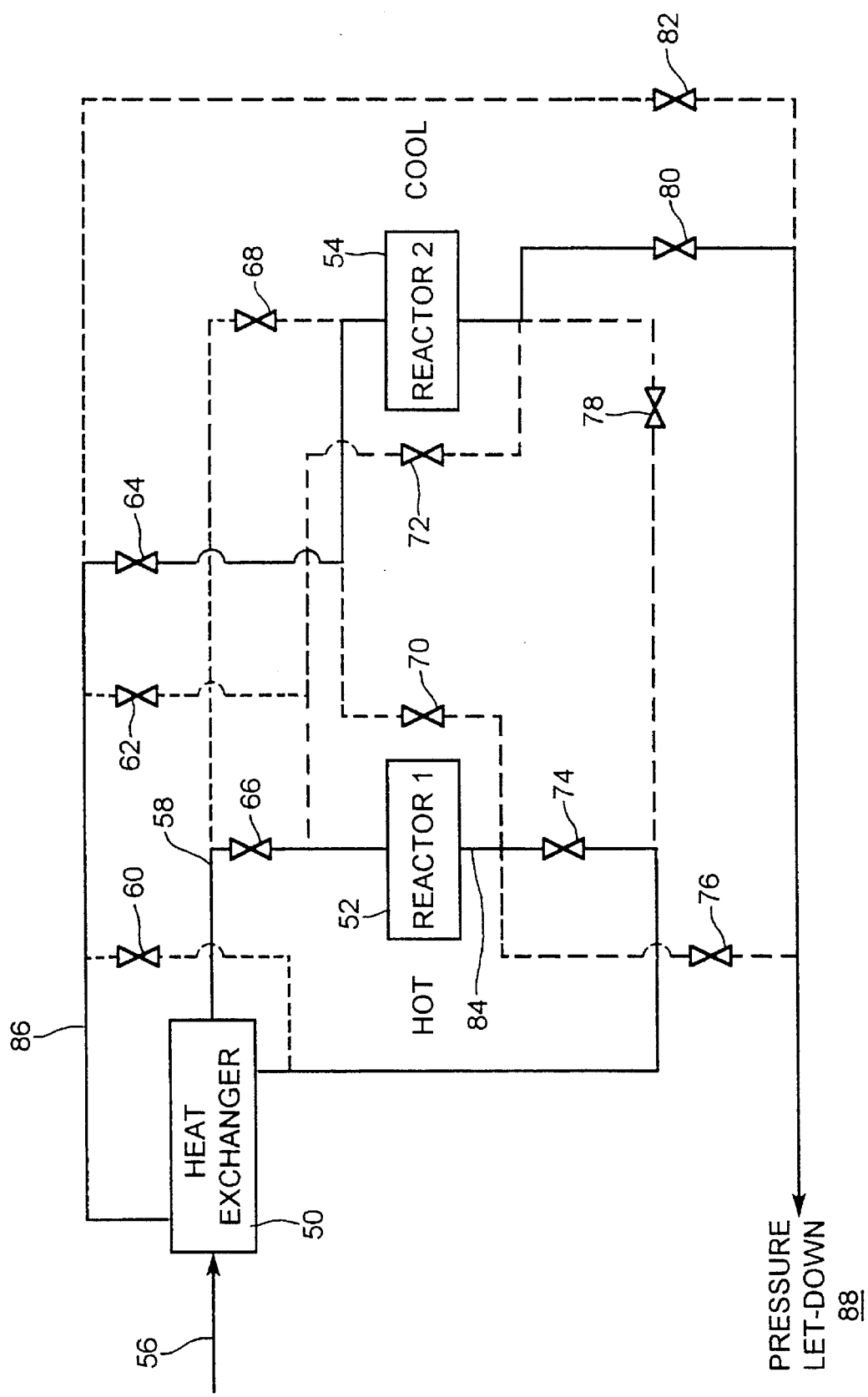
FIG. 2(a) is a schematic view of a first operating phase of a two reactor aspect of the present invention.

As shown in FIG. 2(a), the two reactor system comprises a heat exchanger 50, a first reactor 52 and a second reactor 54. In the first phase, which is shown in FIG. 2(a), valves 60, 62, 68, 70, 72, 76, 78 and 82 are closed while valves 64, 66, 74 and 80 are open. The feed/oxidant stream 56 enters the heat exchanger 50 and is heated therein to a temperature of about 300° C. The heated stream 58 exits the heat exchanger and is fed through a valve 66 into the first reactor 52. The hot reactor effluent 84, which comprises primarily carbon dioxide and water, passes through a valve 74 and into heat exchanger 50, wherein heat is extracted for use in heating the feed/oxidant stream 56. The cooled reactor effluent 86, now at a subcritical temperature and preferably at a temperature of about 300° C., exits the heat exchanger 50 and is fed through valve 64 into the second reactor 54. The cooled reactor effluent 86 dissolves and flushes any inorganic precipitates from the second reactor 54 and passes through valve 80 to any conventional pressure let down means 88 and subsequent disposal according to the nature of the dissolved inorganics.

As can be seen, in this first phase, the feed stream 56 is oxidized in reactor 52, and the hot effluent 84 of reactor 52 is used to heat the feed/oxidant stream 56 in the heat exchanger 50 and then, as cooled reactor effluent, to flush the second reactor 54 of any inorganic precipitates. Operation continues in this first operating phase until the level of scaling approaches an unacceptable level in reactor 52 when operation switches to the second operating phase shown in FIG. 2(b).

Figure 2B:
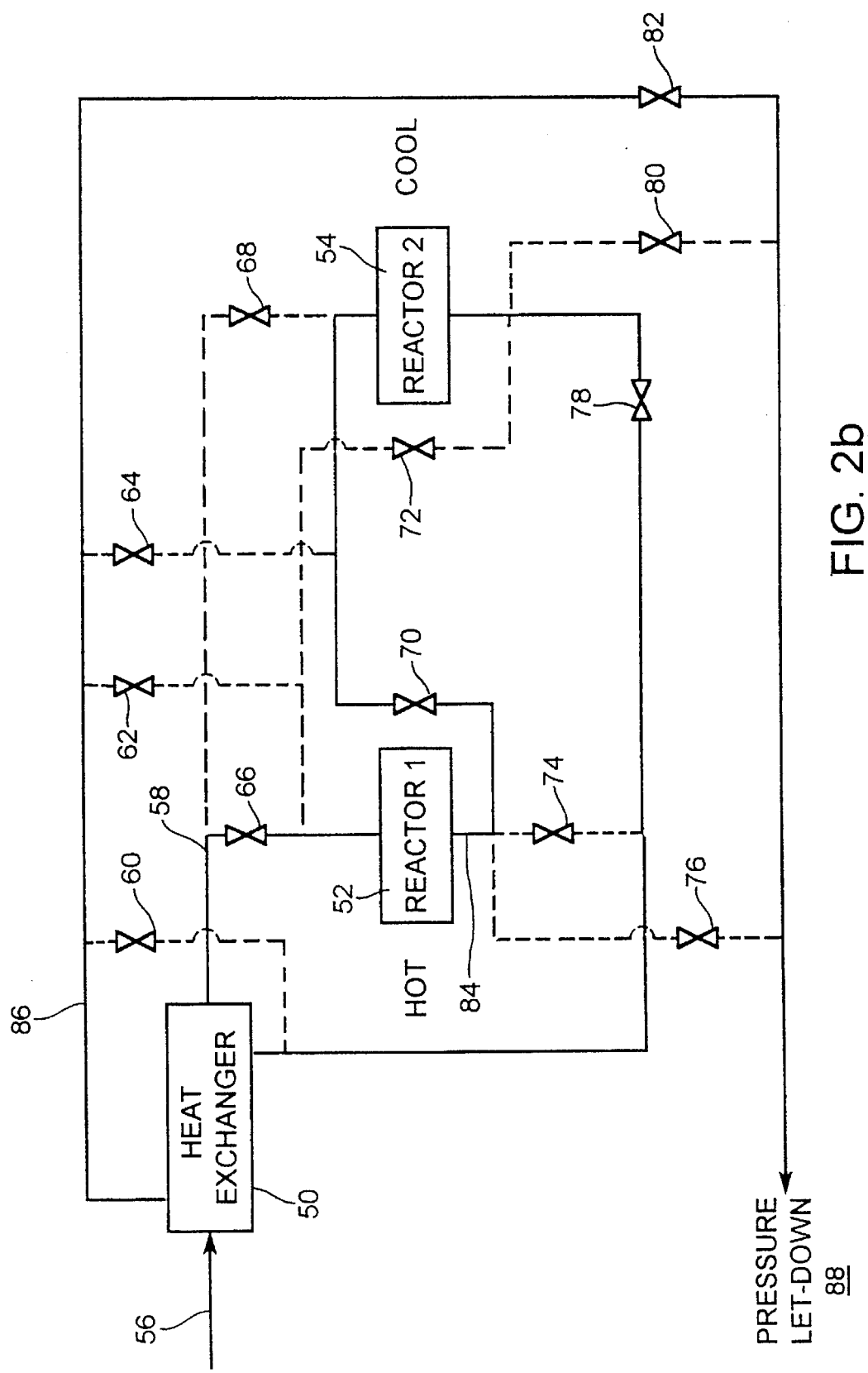
FIG. 2(b) is a schematic view of a second operating phase of the two reactor aspect of the present invention shown in FIG. 2(a)

In the second operating phase shown in FIG. 2(b), valves 66, 70, 78 and 82 are open while valves 60, 62, 64, 68, 72,

74, 76 and 80 are closed. The oxidation reaction in this second phase again occurs in the first reactor 52. However, in this case the second reactor 54 is flushed with hot reactor effluent 84 to pre-heat the second reactor 54 in preparation for carrying out oxidation in it. If such preheating is not done, there is a risk of incomplete oxidation when the heated feed/oxidant stream 58 is first introduced into the reactor. The heated feed/oxidant stream 58 spends a relatively short period of time in the reactor and if some of the heat of the oxidation reaction is used in raising the temperature of the relatively cold reactor, supercritical conditions may not be achieved for a sufficient period of time to ensure complete oxidation of the initial effluent flow. Operation in this second phase continues until the reactor has been preheated to a sufficient level to begin the oxidation reaction in it. Generally, this will take no more than a few minutes.

As with the first phase shown in FIG. 2(a), the feed/oxidant stream 56 enters heat exchanger 50 and is heated and exits as heated stream 58 which passes through valve 66 to the reactor 52. The hot reactor effluent 84 then passes through valve 70 and into the second reactor 54 where some of the heat of the hot reactor effluent 84 is absorbed by the reactor thereby preheating the second reactor 54. The hot reactor effluent then passes through valve 78 to heat exchanger 50 to pressure let down 88.

Figure 2C:
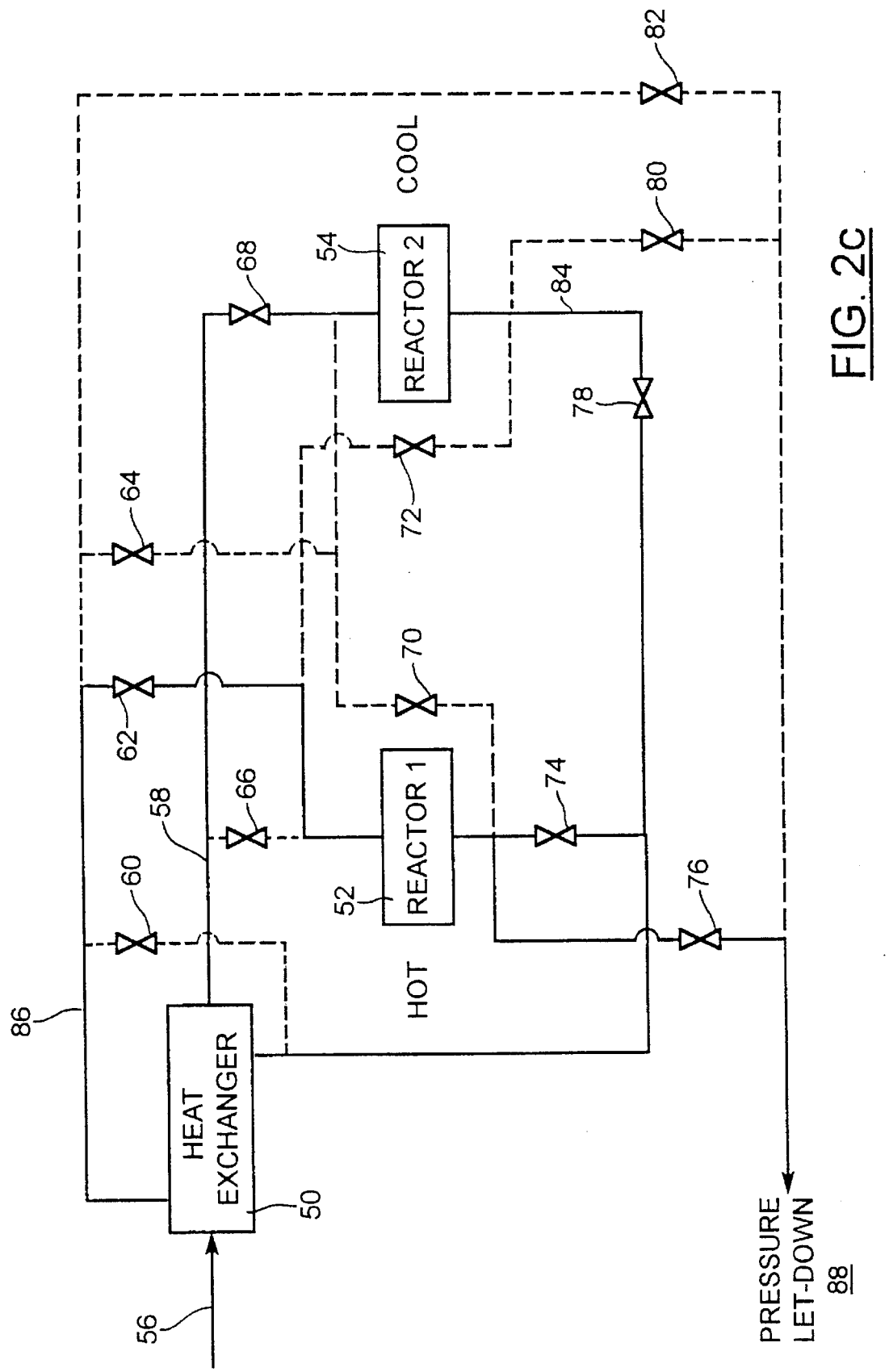
FIG. 2(c) is a schematic view of a third operating phase of the two reactor aspect of the present invention shown in FIG. 2(a)

In the third phase shown in FIG. 2(c), valves 60, 64, 66, 70, 72, 74, 80 and 82 are closed while valves 62, 68, 76 and 78 are open. The feed/oxidant stream 56 enters the heat exchanger 50 and is heated therein to a temperature of about 300° C. The heated stream 58 exits the heat exchanger and is fed through a valve 68 into the second reactor 54. The hot reactor effluent 84, which comprises primarily carbon dioxide and water, passes through a valve 78 and into heat exchanger 50, wherein heat is extracted for use in heating the feed/oxidant stream 56. The cooled reactor effluent 86, now at a subcritical temperature and preferably at a temperature of about 300° C., exits the heat exchanger 50 and is fed through valve 62 into the first reactor 52. The cooled reactor effluent 86 dissolves and flushes any inorganic precipitates from the first reactor 52 and passes through valve 76 to any conventional pressure let down means 88 and subsequent disposal according to the nature of the dissolved inorganics. Again, operation continues in this third phase until unacceptable levels of scaling are approached.

Figure 2D:
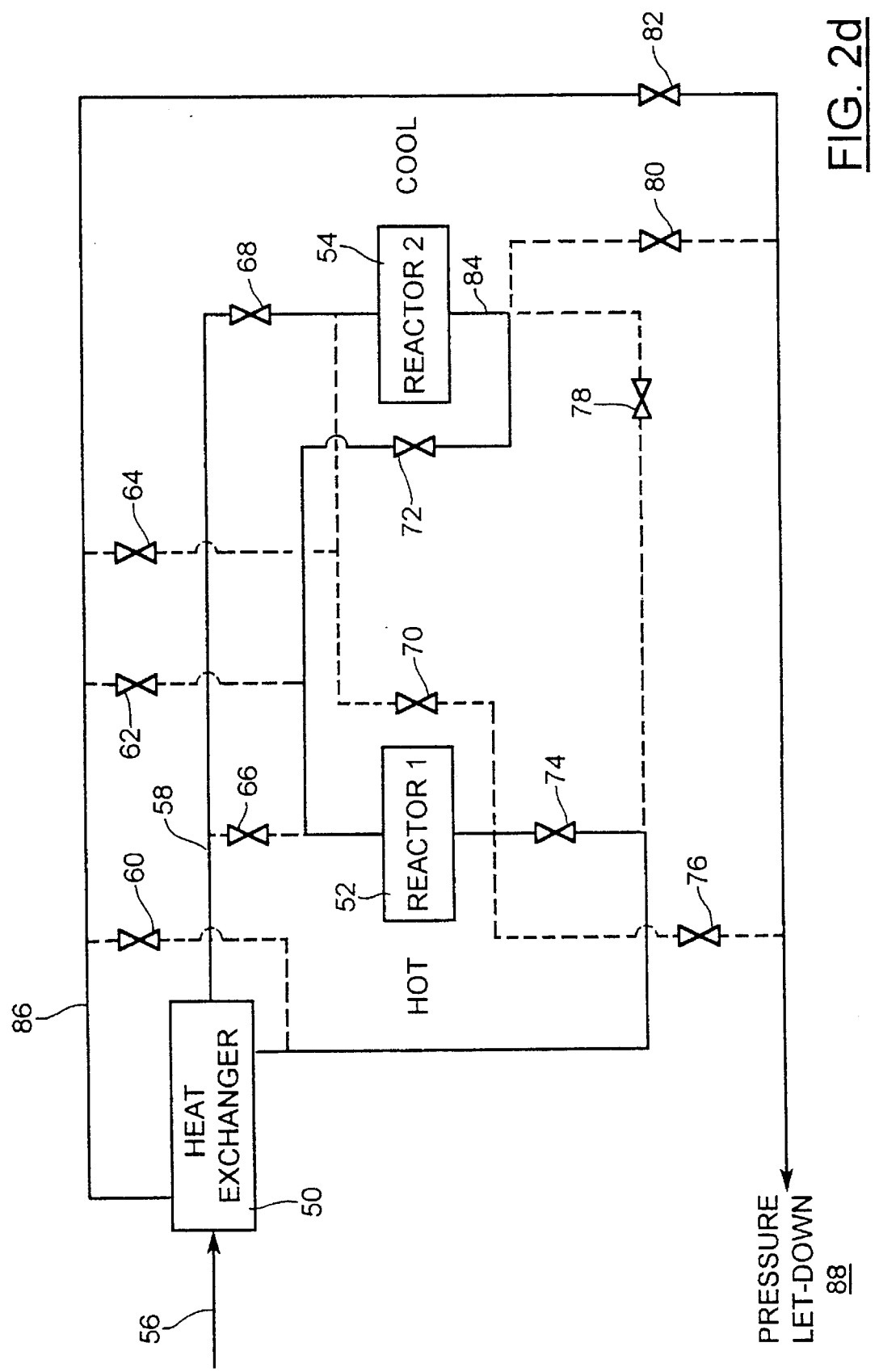
FIG. 2(d) is a schematic view of a fourth operating phase of the two reactor aspect of the present invention shown in FIG. 2(a)

In the fourth operating phase shown in FIG. 2(d), valves 60, 62, 64, 66, 70, 76, 78 and 80 are closed while valves 68, 72, 74 and 82 are open. The oxidation reaction in this fourth phase again occurs in the second reactor 54. However, in this case the first reactor 52 is flushed with hot reactor effluent 84 to pre-heat the first reactor 52 in preparation for carrying out oxidation in it. If such preheating is not done, there is, as previously discussed, a risk of incomplete oxidation when the heated feed/oxidant stream 58 is first introduced into the reactor.

As with the third phase shown in FIG. 2(c), the feed/oxidant stream 56 enters heat exchanger 50 and is heated and exits as heated stream 58 which passes through valve 68 to the reactor 54. The hot reactor effluent 84 then passes through valve 72 and into the first reactor 52 where some of the heat of the hot reactor effluent 84 is absorbed by the reactor thereby preheating the first reactor 52. The hot reactor effluent then passes through valve 74 to heat exchanger 50 to pressure let down 88.

These operating phases are then repeated.

The invention described here can be used not just for the oxidation of organics, but also, for example, to separate a waste stream containing dissolved inorganics into a smaller volume waste stream containing very high concentrations of inorganics and a waste stream that is essentially inorganic free. To effect such a separation, the waste stream containing inorganics can be raised to supercritical conditions by adding organic material to the waste stream, which is then oxidized as previously described, or by adding heat from an external source. In either case, the inorganics in the waste stream precipitate as scale under supercritical condition producing an essentially inorganic free effluent stream. Only a portion of this stream need be used to flush the reactor and remove the precipitated inorganics resulting in a lower volume of effluent with a more highly concentrated inorganic content.

It will be appreciated by those skilled in the art that many variations on the specific embodiments disclosed herein are possible without departing from the spirit or scope of the invention disclosed and claimed herein.

We claim:

1. A reactor combination for oxidizing a feed stream comprising organic compounds, inorganic compounds and water the reactor combination comprising:

a) two or more connected supercritical water oxidation reactors;

b) means to allow said feed stream and oxidant to be directed for oxidation in any one of said reactors;

c) means to allow an effluent stream from said any one of said reactors to cool to a temperature and pressure at which inorganic precipitate formed under supercritical conditions is soluble;

d) means to allow said cooled effluent stream to be directed as a flushing stream to at least one other of said two or more connected supercritical water oxidation reactors to remove inorganic precipitate therefrom, wherein each reactor has a means for alternately supplying said feed stream and said flushing stream to said reactor.

2. The reactor combination of claim 1 further including means to allow said effluent stream to be directed as a heating stream to preheat at least one other of said two or more connected supercritical water oxidation reactors.

3. A reactor combination for oxidizing a feed stream comprising organic compounds, inorganic compounds and water, the reactor combination comprising:

a) two or more connected supercritical water oxidation reactors, each of said reactors have a pair of ends for receiving and/or discharging said feed stream;

b) means to allow said feed stream and oxidant to be directed for oxidation in any of one of said reactors, said means including valves located at each end of said reactors;

c) means to allow an effluent stream from any one of said reactors to cool to a temperature and pressure at which inorganic precipitate formed under supercritical conditions is soluble; and d) valve means to allow said cooled effluent stream to be directed as a flushing stream to at least one other of said two or more connected supercritical water oxidation reactors operating at subcritical conditions to remove inorganic precipitate therefrom, said valve means located at each end of said reactors wherein one portion of said valve means is in the open position to allow said cooled effluent stream to be directed as said flushing stream, while another portion is in the closed position to prevent said feed stream from entering said reactors operating at subcritical conditions, wherein each reactor has a means for alternately supplying said feed stream and said flushing stream to said reactor.

4. The reactor combination of claim 3 further including heat exchanger means and valve means to allow said effluent stream from at least one of said reactors to be directed as a heating stream to preheat at least one other of said two or more connected supercritical water oxidation reactors.

* * * * *